(12) United States Patent
Lykkja et al.

(10) Patent No.: US 10,997,856 B2
(45) Date of Patent: May 4, 2021

(54) TRAFFIC WARNING SYSTEM

(71) Applicant: Q-Free ASA, Trondheim (NO)

(72) Inventors: Ola Martin Lykkja, Rasta (NO); Knut Inge Evensen, Trondheim (NO)

(73) Assignee: Q-Free ASA, Trondheim (NO)

(*) Notice: Subject to any disclaimer, the term of this patent is extended or adjusted under 35 U.S.C. 154(b) by 0 days.

(21) Appl. No.: 16/577,787

(22) Filed: Sep. 20, 2019

(65) Prior Publication Data

US 2020/0098257 A1 Mar. 26, 2020

(30) Foreign Application Priority Data

Sep. 24, 2018 (GB) .................................. 1815489

(51) Int. Cl.
| | | |
|---|---|---|
| *G08G 1/0967* | (2006.01) | |
| *E01F 9/608* | (2016.01) | |
| *E01F 9/646* | (2016.01) | |
| *E01F 9/654* | (2016.01) | |
| *H04W 4/44* | (2018.01) | |
| *H04W 84/20* | (2009.01) | |

(52) U.S. Cl.
CPC ....... *G08G 1/096783* (2013.01); *E01F 9/608* (2016.02); *E01F 9/646* (2016.02); *E01F 9/654* (2016.02); *H04W 4/44* (2018.02); *H04W 84/20* (2013.01)

(58) Field of Classification Search
None
See application file for complete search history.

(56) References Cited

U.S. PATENT DOCUMENTS

| | | | |
|---|---|---|---|
| 3,426,343 A | 2/1969 | Carlson | |
| 6,338,311 B1 | 1/2002 | Ho | |
| 2005/0280553 A1* | 12/2005 | DiPiazza | G08G 1/096758 340/905 |
| 2008/0125970 A1 | 5/2008 | Scheckler | |
| 2008/0198038 A1 | 8/2008 | Yingst et al. | |
| 2012/0256765 A1* | 10/2012 | Selevan | G08G 1/095 340/907 |
| 2015/0254977 A1* | 9/2015 | Grabow | G08G 1/163 340/903 |
| 2016/0321921 A1 | 11/2016 | Stafford et al. | |
| 2018/0132285 A1 | 5/2018 | Jackson et al. | |

FOREIGN PATENT DOCUMENTS

| | | |
|---|---|---|
| CA | 2 353 127 A1 | 1/2003 |
| CN | 105096634 A | 11/2015 |
| CN | 105206075 A | 12/2015 |
| DE | 20 2014 004 569 U1 | 9/2014 |
| WO | WO 03/021044 A1 | 3/2003 |

OTHER PUBLICATIONS

Extended European search report for GB 19198815.3, dated Mar. 4, 2020, 8 pages.

\* cited by examiner

*Primary Examiner* — Thomas S McCormack
(74) *Attorney, Agent, or Firm* — Klarquist Sparkman, LLP (57) ABSTRACT

A system including a plurality of warning devices (100) each with a radio transmitter (111) and a positioning system (109). Each warning device is arranged to communicate with at least one other of the warning devices so that at least one of the plurality of warning devices can determine the mutual positions of the plurality of warning devices, determine a pattern from the mutual positions and transmit a specific message corresponding to the pattern.

19 Claims, 6 Drawing Sheets

TRAFFIC WARNING SYSTEM

CROSS-REFERENCE TO RELATED APPLICATION

This application claims priority to Great Britain Application No. GB1815489.8, filed Sep. 24, 2018, which application is incorporated herein by reference in its entirety.

This invention relates to warning devices, particularly, although not exclusively traffic cones which contain a radio transmitter for transmitting messages to near-by receivers. It is particularly envisaged although not essential that the receivers are located in vehicles.

Warning devices such as traffic cones can be used e.g. by emergency services and by road maintenance to indicate incidents and temporarily closed lanes on roads. A visual warning is traditionally provided to the driver courtesy of the common combination of a bright colour and reflective strip. Some traffic cones may also be fitted with a flashing light to further increase the visibility of the device.

However, as the warning provided to the driver is solely visual, the warning device may fail to alert a driver adequately to a potential hazard ahead in low visibility conditions. The effectiveness of the device will also depend on the driver's concentration, and even in conditions of good visibility is limited by the furthest distance over which the human eye can detect an object.

Previously electronic positioning systems have been proposed to address these problems in which transmission devices are installed in traffic cones, allowing a traffic cone to obtain data on it's geographical position and transmit this data to a remote traffic control centre. The remote traffic control centre may determine the presence of traffic cones from the data received on the geographical positions of the traffic cones and transmit this to drivers or vehicles to give better warning than is provided simply by observing the cones. However such systems rely heavily on additional architecture in the form of remote traffic control centres and suitable receiving units in vehicles which give rise to high implementation costs. Furthermore implementing a remote traffic control centre means that the ability to provide a warning is dependent on the availability of a suitable wide area network and may introduce time delays in passing information to vehicles relating to upcoming traffic cones/incidents, which may be critical for vehicles travelling at high speeds.

When viewed from a first aspect the present invention provides a system comprising:

- a plurality of warning devices each comprising a radio transmitter and a positioning system;
- wherein each warning device is arranged to communicate with at least one other of the warning devices so that at least one of the plurality of warning devices can determine the mutual positions of the plurality of warning devices, determine a pattern from the mutual positions and transmit a specific message corresponding to the pattern of the warning devices.

When viewed from a second aspect the invention provides a method comprising:

- deploying a plurality of warning devices each comprising a transmitter and a positioning system;
- each warning device communicating with at least one other warning device to form a network;
- at least one of the plurality of warning devices establishing mutual positions of the warning devices;
- wherein the at least one warning device recognises a predetermined pattern from the mutual positions and transmits a specific message corresponding to the pattern of the warning devices.

Thus it will be seen by those skilled in the art that in accordance with at least embodiments of the invention, warning devices (such as cones) can establish their mutual arrangement between themselves and use this to determine their pattern on the road and from that a suitable amounted warning message, for example a Decentralized Environmental Notification Message (DENM) which can provide closed lane and merge left/right information. Other forms of Cooperative Intelligent Transport Systems (C-ITS) message include: Cooperative Awareness Message (CAM), Basic Safety Message (BSM), Traveller Information Message (TIM) and In-Vehicle Information (IVI) messages.

In order to aid the transmission of a relevant specific message, it may be beneficial for a warning device to be aware of its position with respect to the road and the direction of traffic flow on the road upon which it is placed. Therefore in a set of embodiments at least one of the warning devices determines its position with respect to the road.

A warning device may determine its position with respect to the road using Global Navigation Satellite System (GNSS) and maps (of at least roads) stored in the device's memory. In order to determine the position of the device with respect to the road with greater precision, the following may be implemented instead of, or alongside, GNSS: LIDAR and optical imaging cameras. For example, to obtain a time-of-flight distance measurement a warning device may emit a signal (e.g. laser, ultrasound or radar) which is reflected by a kerb or barrier on the edge of the road, then detected back at the warning device and a central processing unit within the device determines from the flight time of the signal the distance between itself and the reflecting object. This may provide more precision on the location of the warning device with respect to the road so that, for example, it can be determined which side of the road the device is on, or which lane or carriageway. The list above is not exhaustive, and it is envisaged that multiple techniques may be implemented simultaneously.

In a set of embodiments at least one of the plurality of warning devices determines the direction of traffic flow. A warning device may determine the direction of traffic flow using a radar transmitter and receiver, where an oncoming vehicle reflects the radar signal and a Doppler shifted radar signal is received by the radar receiver in the warning device. A central processing unit in the warning device determines from the Doppler shift the direction of approach of the oncoming vehicle. The central processing unit may also determine speed of an oncoming vehicle from the observed Doppler shift. Alternatively, information on direction of traffic flow may be received from a third party, e.g. approaching vehicles with C-ITS equipment or a remote station.

It is envisaged that the message transmitted may be transmitted to a roadside receiver or a remote central station. In a set of embodiments however the message is transmitted to vehicles in the vicinity of the warning devices. These embodiments remove the need for additional infrastructure such as a remote central station for receiving the message transmitted from the system and transmitting a corresponding message to vehicles in the vicinity of the warning cone system. Furthermore removing the need for additional architecture overcomes issues with time delays in passing information to vehicles relating to up-coming incidents and issues with communication via mobile networks which have incomplete coverage in certain regions. In a subset of these embodiments the message is transmitted in an Intelligent Transport System (ITS) format, allowing the message to be received by local vehicles with ITS capabilities.

It should be appreciated that whilst it may be convenient for the same warning device to determine the mutual positions of the plurality of warning devices, determine a pattern from the mutual positions and transmit a specific message corresponding to the pattern of the warning device, all of these steps need not necessarily be carried out by the same warning device. For example a first warning device which determines the mutual positions of the plurality of warning devices may transmit this information to a second warning device. The second warning device may then use this information to determine the pattern. All three steps could be carried out by different warning devices which communicate with each other.

In a set of embodiments at least one warning device compares the established mutual positions of the plurality of warning devices to a library of patterns of warning devices in order to determine the closest pattern. This library of patterns may be stored in the memory of the at least one warning device within the plurality. In a subset of these embodiments the at least one warning device determines the similarity of the mutual positions to the patterns in the library of patterns, and if the mutual positions are not within a predetermined similarity or correlation limit, the warning device may transmit a non-specific message e.g. 'incident ahead' rather than a specific message corresponding to the pattern of the warning devices.

The system may comprise, and the method may be applicable to, any number of warning devices greater than or equal to two. Each warning device may communicate with one other warning device, its nearest n neighbouring devices, warning devices within a predetermined range (e.g. within 500 metres) or all warning devices in the plurality. Additional cones may be added to the system and automatically form a network with other warning devices in the plurality.

In a set of embodiments the warning device comprises a radio transmitter. In a subset of these embodiments the radio transmitter comprises an Intelligent Transport System (ITS) station. In a subset of these embodiments the ITS system comprises a central processing unit, persistent storage, volatile memory, short range communications subsystem (e.g. 5.9 GHz or Cellular-V2X), positioning subsystem and a cellular communications system.

In a set of embodiments a warning device automatically forms a network with other warning devices. In subset of these embodiments warning devices with ITS systems (typically with a 5.9 GHz communication channel) will automatically form a network with other ITS stations nearby. Automatic formation of a network is advantageous as it removes the need for human input which would be impractical in a roadside situation. It also increases consistency and aids a quicker set up of the network.

In a set of embodiments at least one of the plurality of warning devices may conclude from the relative positions of the warning devices the pattern formed is a diagonal slant. A 'merge left' message or a 'merge right' message may then be transmitted as appropriate (e.g. according to an established position of the warning device relative to the road. This message informs the oncoming driver of lane closure or an incident, providing the necessary instructions as to how to proceed i.e. to move lane.

In a set of embodiments at least one of the plurality of warning devices may conclude from the relative positions of the warning devices that the pattern formed is a straight line across the road. A message corresponding to this may then be transmitted e.g. 'lane ahead closed'.

In a set of embodiments the message is transmitted in a European Telecommunications Standards Institute (ETSI) format.

In a set of embodiments the message comprises a CAM and/or DENM and/or IVI warning message. In another set of embodiments e.g. for systems for use in the US, the message comprises a BSM and/or TIM and/or IVI warning message. The use of standardised messages is advantageous as it does not require new software/hardware to be installed in vehicles. The message formats mentioned above are not limiting and any relevant warning message could be used.

In a set of embodiments the message is transmitted in format described by the European Telecommunications Standards Institute (ETSI), SAE International (SAE J2735) and/or IEEE 1609.

In a set of embodiments the warning devices communicate with one another via a protocol based on IEEE 802.11p and ESTI G5 standards. The IEEE 802.11p standard is a set of media access control and physical layer specifications for implementing a wireless local area network which is enabled to include vehicle communication systems. It is envisaged that this protocol is situated at the same level as CAM and DENM communications. In a set of embodiments the protocol enables the warning device to act as a 'universal' ITS station, enabling communication via a variety of standards. This increases the number of ITS enabled devices the warning device can communicate with.

In a set of embodiments the warning device deploys automatically from a collapsed state to an expanded state. In the collapsed state the warning device, for example a traffic cone, may be compressed into its base. This allows for more compact storage of the warning device and ease of portability. The mechanism for retaining the warning device in this collapsed position may comprise for example a pair of magnets, a locking device with a male and female member, a latch, a clip or a housing box.

In a set of embodiments the transmitter is activated upon deployment of the warning device. This may be achieved using a mechanism for completing the transmitter circuit upon deployment e.g. a micro switch, reducing the element of human interaction required to set up the system.

In a set of embodiments the warning device is arranged to cease or reduce transmission upon collapse of the expandable structure from the expanded state to the collapsed state. This may be achieved using the mechanism used for deployment, working in reverse or a different mechanism could be employed. Upon collapse of a warning device, the warning device may thus be removed from the system automatically.

In a set of embodiments the system comprises, and the method relates to, a master warning device and a set of slave warning devices. In a subset of these embodiments the master determines the arrangement of the warning devices. In an overlapping subset of these embodiments the master generates the message corresponding to the mutual positions of the warning devices. In such embodiments the master device may communicate with all the slave devices. In a set of embodiments the slave devices only communicate with the master device. Alternatively, the slave devices may communicate with other slave devices as well the master device.

In a set of embodiments, the system dynamically elects which of the plurality of warning device will act as the master device. This allows the system during use to determine which of the plurality of warning devices will act as the master device rather than requiring one to be hard-wired or pre-assigned.

In a set of embodiments the master warning device has library of patterns of mutual positions of a plurality of warning devices stored in the memory or in an additional memory installed in the master warning device.

Any of the plurality of devices which contains a library of patterns of mutual positions of a plurality of warning devices stored in its memory may act as the master warning device. In a set of embodiments the master warning device is the first warning device within the plurality to be deployed. This device may transmit a signal (the 'master signal') on a warning device communication channel which specifies it is acting as the master device. Upon deployment, a warning device may listen for a signal from a master device. If, after a certain period of time, e.g. 30 seconds, no such signal is detected, this warning device may begin to act as master device, e.g. by transmitting the aforementioned master signal. It is envisaged by the Applicant that only warning devices with a library of patterns of a plurality of warning devices stored within the memory thereof are capable of being a master device and therefore only these devices are capable of transmitting the master signal. In a set of embodiments, within a plurality of devices there are a plurality of devices capable of acting as master devices e.g. the devices could be identical.

In a set of embodiments the warning devices are traffic cones.

When viewed from a third aspect the invention provides a warning device comprising:
 a radio transmitter;
 a positioning system;
 a memory;
wherein a library of patterns of mutual positions of a plurality of warning devices is stored within the memory.

Certain embodiments of the present invention will now be described, by way of example only, with reference to the accompanying drawings in which.

Figure 1:
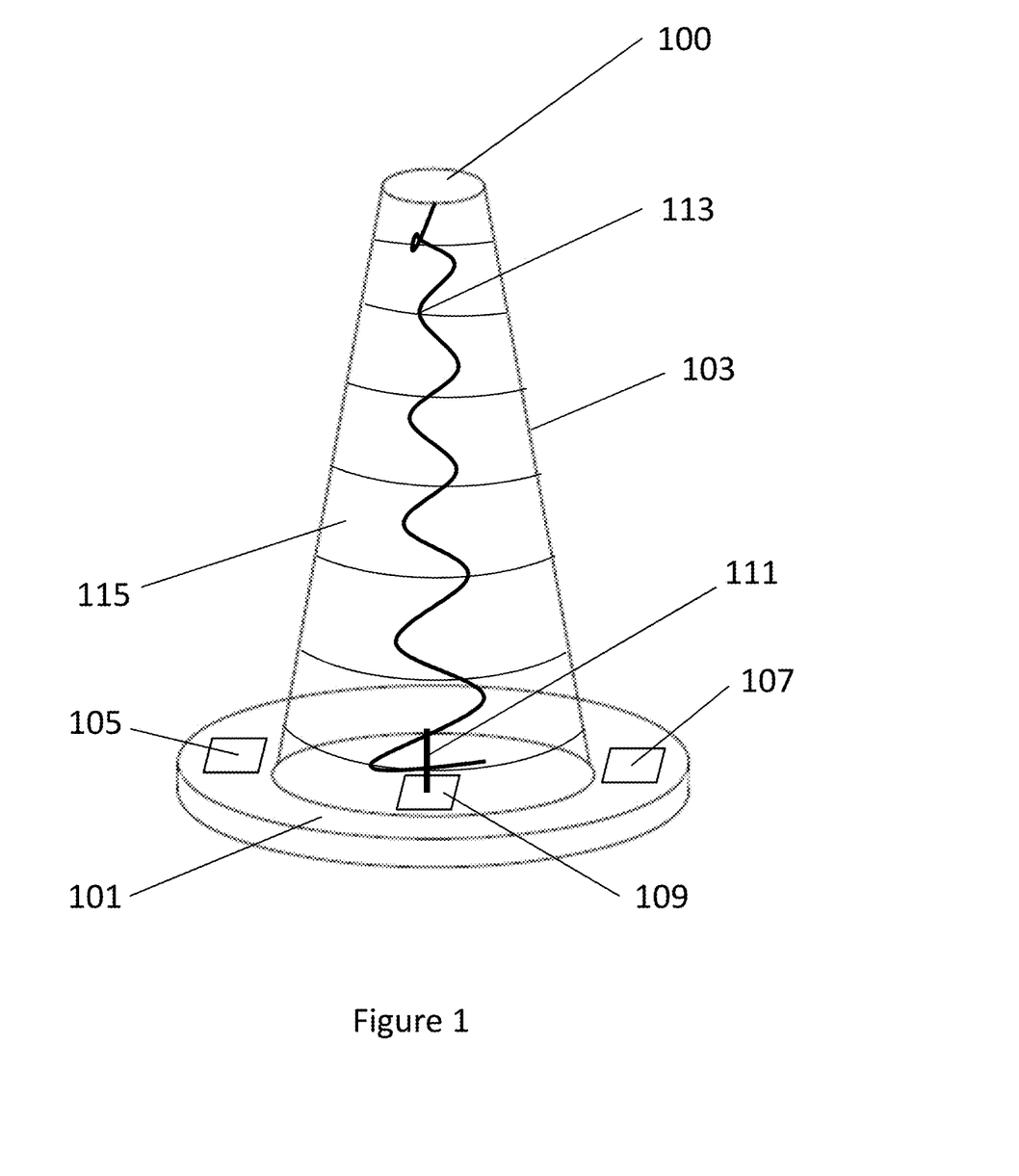
FIG. 1 shows a traffic warning device in accordance with the invention in the form of a collapsible traffic cone.

FIG. 1 is a partially transparent view of a traffic warning device in the form of a collapsible traffic cone 100. The traffic cone comprises a base 101 and a hollow conical frustum 103. The walls of the hollow conical frustum 103 may be formed by a series of rings, which decrease in radius from the base to the top of the conical frustum. This allows each ring to sit within the corresponding lower ring, allowing the conical frustum to be collapsed into the base. The traffic cone 100 is in its collapsed state when the conical frustum 103 is collapsed to the base 101, and is in its expanded state when the conical frustum 103 is erect. The rings are made of a rigid plastic material. In other embodiments the cone could itself comprise a continuous resilient helix which can be collapsed by pressing on it and which springs up again on release. The conical frustum may be formed from a non-rigid textile, with sufficient rigidity to be supported by a spring.

The collapsible traffic cone 100 also contains rechargeable batteries 105, 107 within the base 101. The batteries provide a power source for ITS station components 109 also located in the base, and provide increased stability to the cone as a secondary function. The ITS station components 109 include a positioning system such as a GNSS and an antenna 111, which is capable of working as both as transmitter and a receiver. The antenna 111 acts as a transmitter and receiver for communication between traffic cones, and also as a transmitter for communications between the traffic cone and vehicles (or alternatively a central station) using either GSM/LTE and/or 5.9 GHz communication. In some embodiments there are three antennas assigned to the GNSS, GSM/LTE and 5.9 GHz communication channel respectively. The collapsible traffic cone 100 is deployed via a spring-loaded mechanism comprising a compression spring 113.

Figure 2:
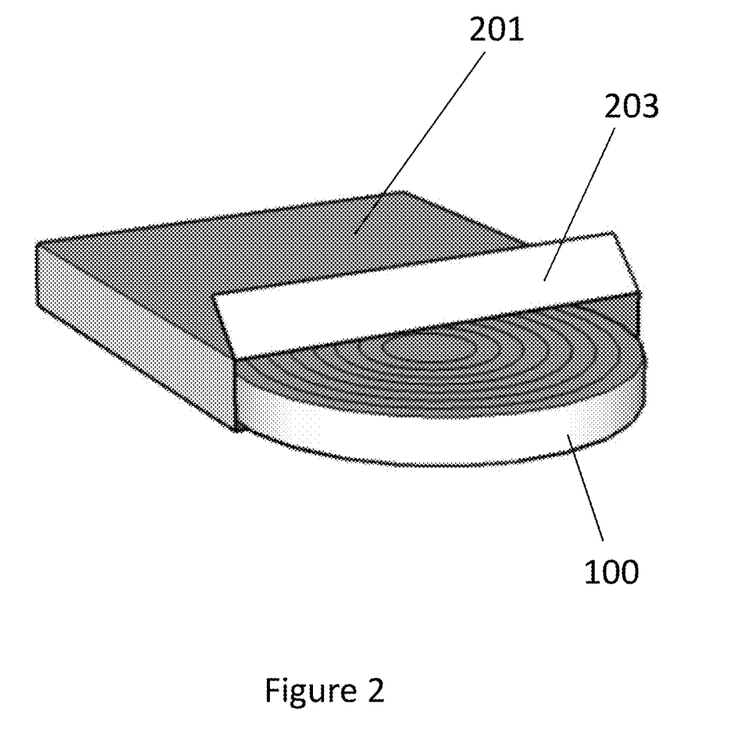
FIG. 2 shows the collapsed state of a collapsible traffic cone.

FIG. 2 is a diagram of a storage box 201 for the collapsible traffic cone 100 shown in FIG. 1. The traffic cone 100 in the collapsed state shown in FIG. 2 is stored within the box 201 which comprises sides of length equal to or greater than the circumference of the base of the traffic cone 100, and an opening/closing side 203 through which the traffic cone 100 can be inserted into, or removed from, the box. The opening/closing side 203 may include a device such as a latch or pair of magnets to securely close the box 201 to prevent the collapsed traffic cone 100 from sliding out. Using a storage box 201 such as that shown may circumvent the necessity for the traffic cone to include a latch mechanism to hold it in its collapsed state.

Figure 3:
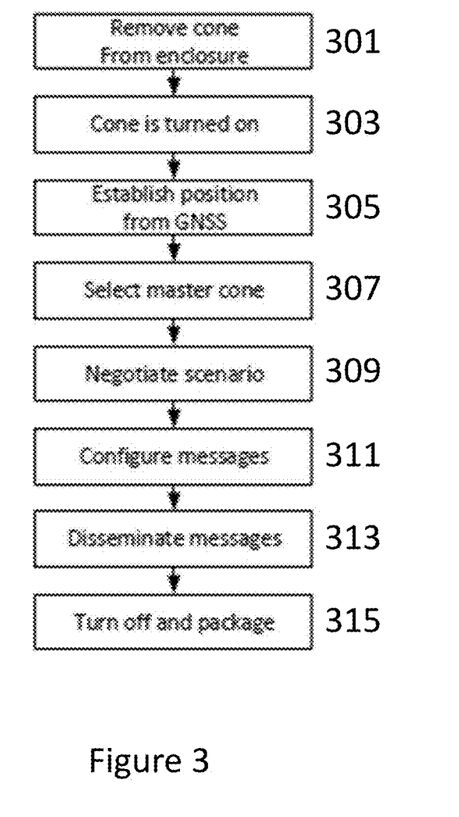
FIG. 3 is an exemplary sequence diagram showing the deployment and de-activation sequence of a traffic cone.
Figure 4:
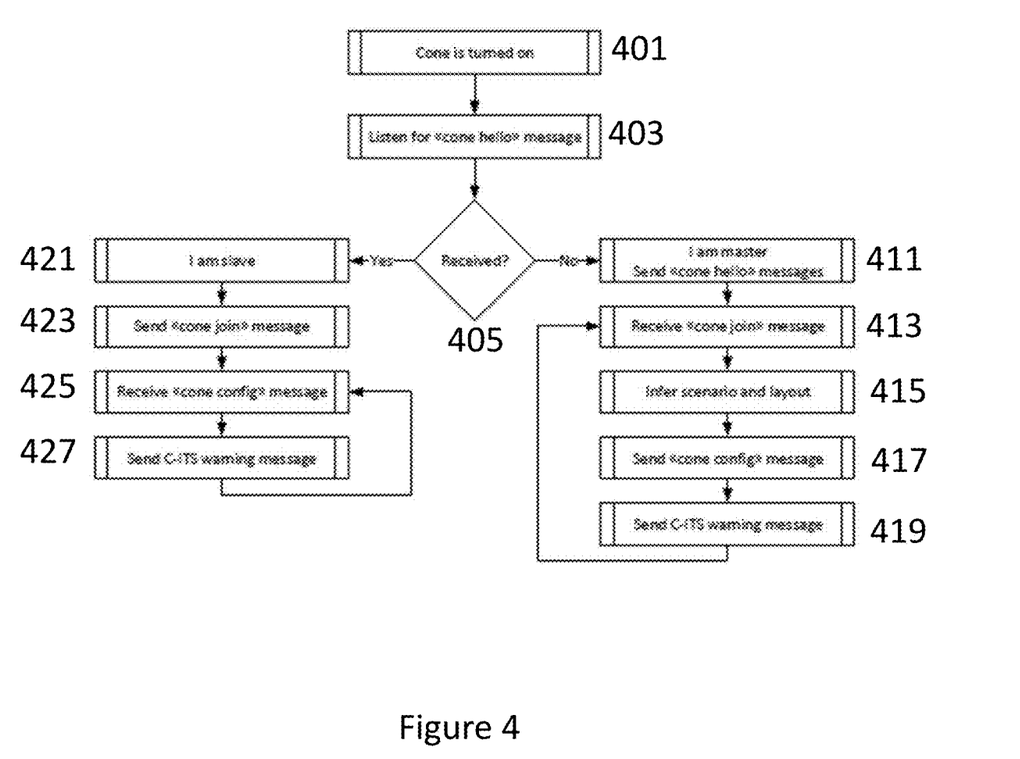
FIG. 4 is an exemplary sequence diagram for the negotiation procedure during set-up for a master and a slave device.

Use of the cone 100 will now be described with further reference to FIGS. 3 and 4. FIG. 3 shows a sequence diagram for the deployment and deactivation of a traffic cone such as that shown in FIG. 1. FIG. 4 demonstrates the negotiation procedure which occurs between master and slave warning devices.

Referring first to FIG. 3, in step 301 the traffic cone is removed from a box 201 (e.g. as seen in FIG. 2). Typically, an emergency worker or member of an initial response team removes the traffic cone from the box. The spring 113 which compressed when the cone is in its collapsed state automatically expands when the traffic cone 100 is removed from the box 201, deploying the conical frustum structure 103.

In step 303 the ITS station electronics are activated automatically upon deployment, with power being supplied from the rechargeable batteries found in the base 101 of the traffic cone. This is achieved by the ITS station electronics 109 being activated upon expansion of the traffic cone from the collapsed to expanded state, achieved for example using a micro-switch or electromagnetic inductance.

In step 305 the traffic cone establishes its position using the Global Navigation Satellite System (GNSS).

In step 307 the master cone is selected using the method shown in FIG. 4. It is assumed that all cones contain a library of patterns of mutual positions of a plurality of warning devices stored within their memory and can thus act as the master device. This is not essential however and in other embodiments some cones could be less sophisticated and capable only of acting as slaves. For both master and slave devices, the cone is deployed at step 401 and listens for a master signal at step 421. If a master signal is received at step 405 within a certain time period e.g. 30 seconds, the cone behaves as a slave (step 421). If a master signal is not received at step 405 within a certain time period e.g. 30 seconds, the warning device behaves as a master and begins to transmit a master signal (step 411).

In the situation where the warning device behaves as a master device, the device will receive 'join' messages from potential slave devices. The master device may then determine whether the slave device meets a set of criteria to join the network. The join message also provides the master with information on the position of the potential slave cone. This information is used by the master device together with information from other slave/potential slave devices to determine the mutual positions and pattern of the devices (step 415). More specifically the master device tries to recognise a pattern from the mutual positions of the traffic cones using the library of patterns stored in its memory. Each pattern in the library has an associated specific message relating to the pattern of the traffic cones. The master device then transmits the specific message corresponding to this pattern e.g. 'merge left', 'merge right'. The master cone may also use information about its own precise position relative to the roads to determine which side of the road it is on or which lane it is in.

In step 417 the master device then transmits a configuration message to accepted slave devices which specifies the configuration of the network and the specific warning messages corresponding acknowledgement to the pattern of the devices. The master device also transmits the specific warning message to be received by local ITS equipped apparatus such as vehicles (step 419). The slave devices may also transmit a corresponding message after detecting the message transmitted by the master device to maximise the opportunity for the message to be received.

Steps 413 to 419 may be repeated to allow new slave devices to join the network and to allow the configuration of cones to change during the deployment of the cones e.g. due to battery outages or cone replacements.

In the situation where the warning device behaves as a slave, the device sends out a join message to the master device responsible for the master signal at step 432 which includes information on the slave device's position. The device will then receive a configuration message from the master device (step 425). The configuration messages provides information necessary for the slave device to join the master's network of warning device, and details of the specific warning message to be transmitted. At step 427 the slave device transmits the specific warning message which is received by local ITS-equipped receivers. Steps 425 and 427 may then repeated, which allows for configuration changes to the network.

Returning to FIG. 3, the steps of negotiating the scenario by determining the relative positions of the cones and configuring and disseminating the corresponding messages are illustrated at steps 309 to 313.

In step 315 when a traffic cone is no longer required to indicate an incident or closed road e.g. the accident site has been cleared, the traffic cone can be collapsed from its expanded state to its collapsed state. Upon collapse the ITS system 109 in the traffic cone may also be de-activated using the same mechanism as for the automatic activation on deployment. An emergency worker or a member of highway maintenance manually compresses the conical frustum 103 into the base 101. Once compressed the traffic cone 100 is inserted into the storage box 201. The traffic cone may be secured in the collapsed position by a latching feature on the spring loaded mechanism, the storage box 201 or a combination of both.

In the situation where a master device is deactivated, the warning devices which previously acted as slave devices will no longer receive a configuration message from the master device. In order to account for any changes made to the configuration of the cones upon or after the deactivation of the master device, after a certain amount of time of no configuration message being received one of the remaining slave devices (which has the capability of being a master device) may transmit a master signal. The behaviour of the system then continues in the same manner as described above.

Figure 5:
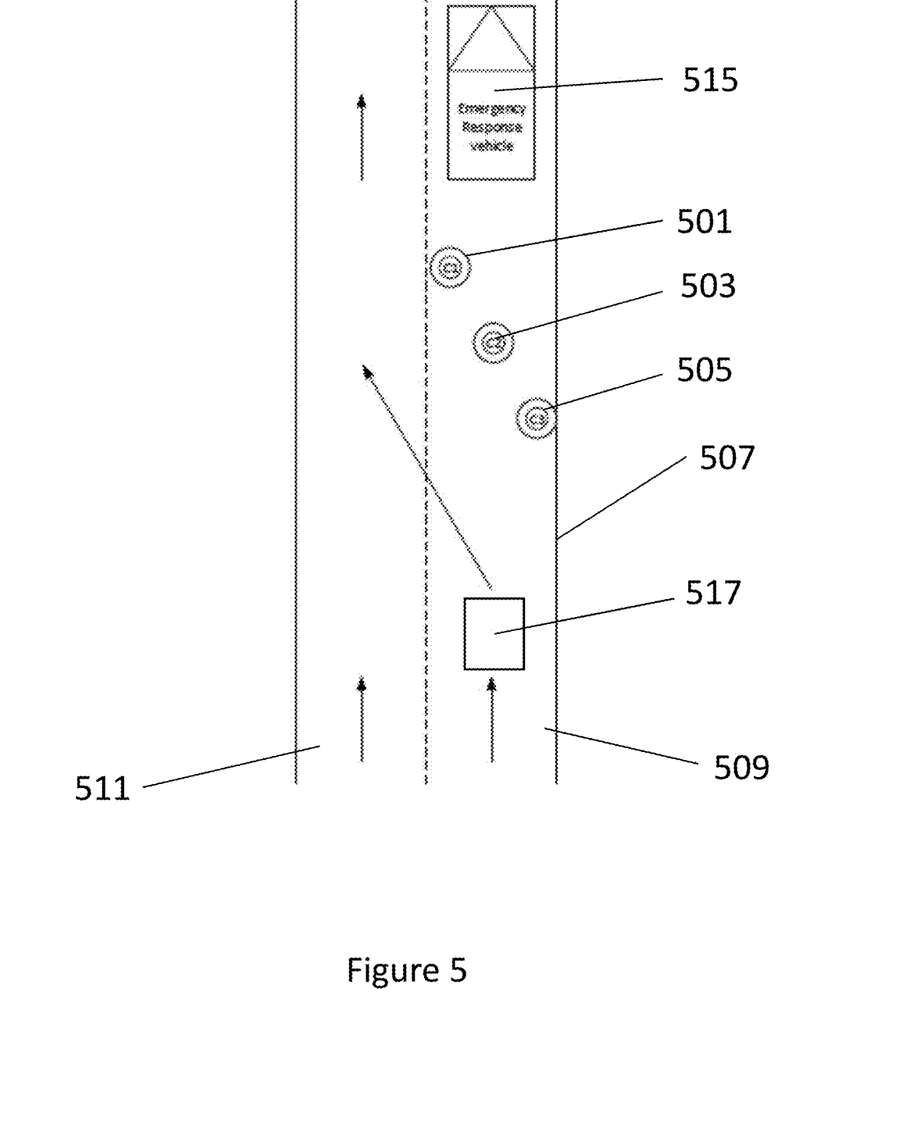
FIG. 5 shows an exemplary deployment scenario and possible layout of traffic warning devices.

FIG. 5 shows an exemplary road incident in which the described warning cones are deployed. An emergency response vehicle 515 arrives at the scene of an incident which has occurred on the right hand lane 509 of a two lane road 507. The emergency worker deploys three traffic cones 501, 503, 505 in a diagonal arrangement across the blocked lane. Using the steps described with reference to FIGS. 3 and 4, the set of traffic cones determine a specific message relating to their mutual positions. At least one of these traffic cones may also be fitted with a radar transmission and receiving electronics as part of the ITS system which allows the system of traffic cones to determine the direction of traffic flow and so select the correct message of 'move/merge left' or 'move/merge right'. Upon determining the relative direction of traffic flow, the system transmits a 'move/merge left' message, which is received by a vehicle 517 with ITS capabilities. The vehicle can then safely move across to the left hand lane 511. The 'move/merge left' or 'move/merge right' message may also be determined from a map stored in the memory of at least one of the traffic cones.

Figure 6:
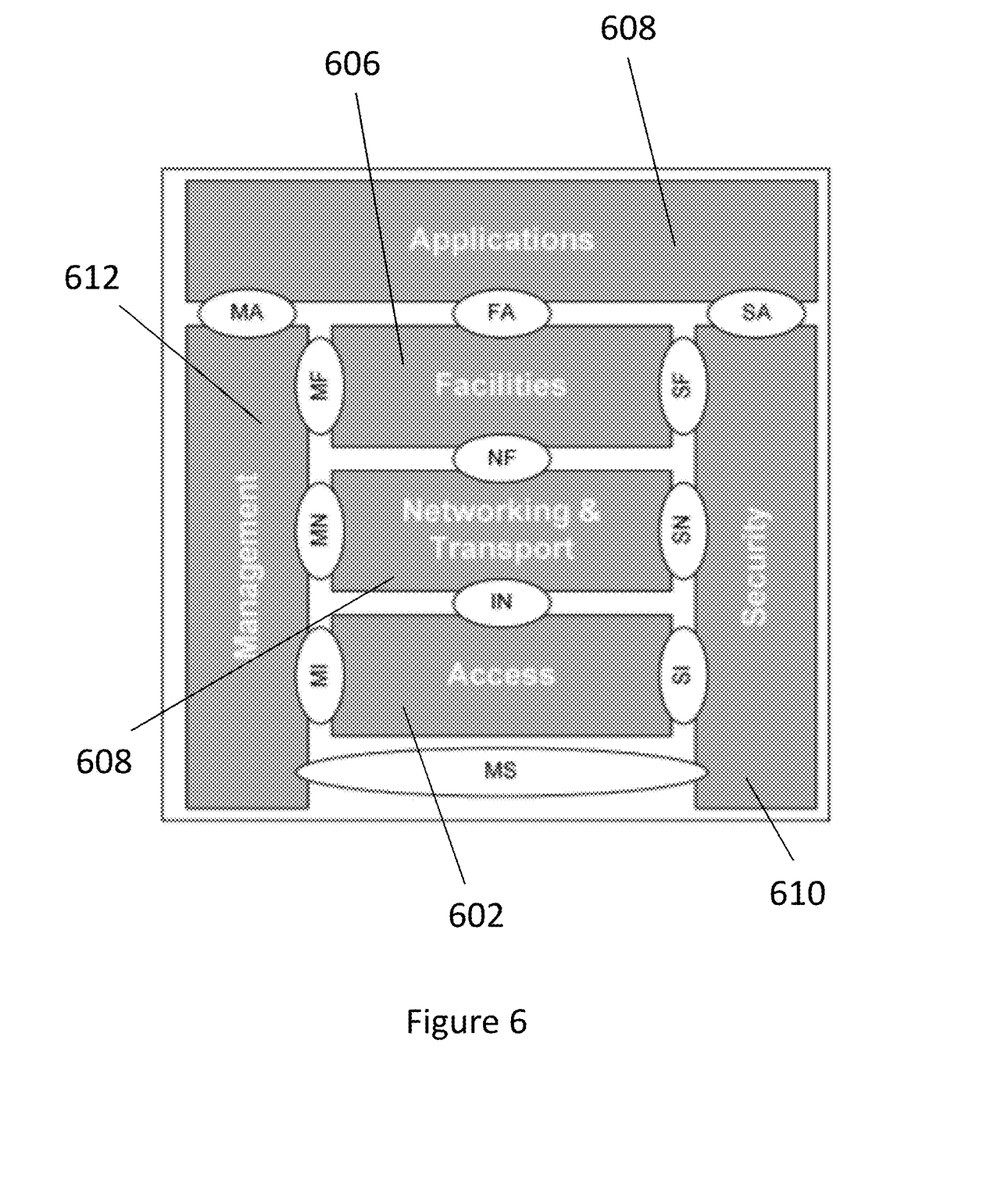
FIG. 6 is a diagram of the ITS station reference architecture.

The traffic cone as seen in FIG. 1 may implement a European Standard for ITS, in particular the standard ETSI EN 302 665. This standard requires certain features in the ITS architecture. FIG. 6 is a schematic diagram of the ETSI/ISO ITS architecture. The access layer 602 provides the physical layer of the architecture, which is built upon by the networking and transport layer 604. The encoding/serialization of CAM/DEMN is located within the facilities layer 606 which is built upon the networking and transport layer 604. The communications sent between the warning devices, and between warning devices and vehicles belong to the applications 608.

Thus it will be appreciated by those skilled in the art that the specific embodiments of the inventive concepts described herein provide a system that allows the rapid and reliable establishment of a network of warning devices which can self-determine their configuration and thus what message to transmit automatically to approaching vehicles. This may provide significant benefits over known systems. It will further be appreciated however that many variations of the specific arrangements described here are possible within the scope of the invention.

The invention claimed is:

1. A system comprising:
a plurality of warning devices each comprising a radio transmitter and a positioning system;
wherein each warning device is arranged to communicate with at least one other of the warning devices so that at least one of the plurality of warning devices can determine the mutual positions of the plurality of warning devices, determine a spatial pattern from the mutual positions by comparing the established mutual positions of the plurality of warning devices to a library of spatial patterns of warning devices in order to determine a closest spatial pattern wherein the closest spatial pattern is determined from the similarity of the mutual positions to the spatial patterns in the library of spatial patterns and transmit a specific message corresponding to the closest spatial pattern.

2. The system as claimed in claim 1, wherein at least one of the warning devices is arranged to determine its position with respect to a road.

3. The system as claimed in claim 1, wherein at least one of the plurality of warning devices is arranged to determine a direction of traffic flow.

4. The system as claimed in claim 1, further comprising a roadside receiver wherein the roadside receiver is arranged to receive the specific message.

5. The system as claimed in claim 1, arranged to transmit the specific message to vehicles in the vicinity of the warning device.

6. The system as claimed in claim 1, wherein each warning device is arranged to automatically form a network with other warning devices within the plurality.

7. The system as claimed in claim 1, wherein the specific message comprises one of the formats selected from the following groups: a CAM and/or DENM and/or IVI warning message; a BSM and/or TIM warning message or a format described by ETSI, or SAE International (SAE J2735) or IEEE 1609.

8. The system as claimed in claim 1, wherein each of the warning devices is arranged to deploy automatically from a collapsed state to an expanded state.

9. The system as claimed in claim 1, wherein each of the transmitters is arranged so as to activate upon deployment of the warning device.

10. The system as claimed in claim 1, wherein each of the warning devices is arranged to cease or reduce transmission upon collapse of the expandable structure from the expanded state to the collapsed state.

11. The system as claimed in claim 1, wherein the system comprises a master warning device and a set of slave warning devices wherein the master warning device is arranged to determine the mutual positions of the plurality of warning devices.

12. The system as claimed in claim 11, wherein the system is arranged to dynamically elect which of the plurality of warning device will act as the master device.

13. The system as claimed in claim 11, wherein the master warning device is arranged to generate the specific message.

14. The system as claimed in claim 11, wherein the master warning device has a library of patterns of mutual positions of a plurality of warning devices stored in the memory or in an additional memory installed in the master warning device.

15. The system as claimed in claim 11, wherein within the plurality of warning devices there are a plurality of warning devices capable of acting as master devices.

16. The system as claimed in claim 11, wherein the slave devices are arranged to receive a master signal transmitted by a master device and if after a predetermined period the slave devices does not detect the master signal, at least one slave warning device is arranged to act as a master device.

17. A method comprising:
deploying a plurality of warning devices each comprising a transmitter and a positioning system;
each warning device communicating with at least one other warning devices to form a network;
at least one of the plurality of warning devices establishing mutual positions of the warning devices;
wherein the at least one warning device recognises a predetermined pattern from the mutual positions by comparing the established mutual positions of the plurality of warning devices to a library of spatial patterns of warning devices in order to determine a closest spatial pattern wherein the closest spatial pattern is determined from the similarity of the mutual positions to the spatial patterns in the library of spatial patterns and transmits a specific message corresponding to the closest spatial pattern.

18. The method as claimed in claim 17, further comprising at least one warning device determining its position with respect to the road.

19. The method as claimed in claim 17, wherein at least one of the plurality of warning devices determines a direction of traffic flow.

* * * * *